Oct. 18, 1966    L. J. LOGAN    3,279,517
WELD BOLT
Filed Feb. 27, 1964

INVENTOR.
LEWIS J. LOGAN
BY Woodling, Krost, Granger & Rust
Attys.

United States Patent Office 3,279,517
Patented Oct. 18, 1966

3,279,517
WELD BOLT
Lewis J. Logan, 11820 Edgwater Drive, Lakewood, Ohio
Filed Feb. 27, 1964, Ser. No. 347,914
3 Claims. (Cl. 151—41.7)

This invention relates to a bolt adapted to be resistance-welded to a convex surface.

Prior to the present invention, serious difficulty has been encountered in resistance-welding bolts to convex surfaces, for example, in the manufacture of shock absorbers for automobiles and trucks. Weld bolts have been proposed having specially shaped heads for this purpose, but they have not been entirely satisfactory in practice.

This present invention is directed to a weld bolt which overcomes the difficulties previously encountered in such situations.

It is the principal object of this invention to provide a novel and improved weld bolt.

It is also an object of this invention to provide such a bolt having a head of novel configuration which adapts it to be resistance-welded to a convex surface. Another object of the invention is to provide a weld bolt with an end which enables one to obtain a periphery type weld for greater strength and particularly for larger shapes and sizes.

Another object of this invention is to provide a weld bolt which has a head adapted to fit a curved surface for improved stability both before and after welding and which also has a construction to better pass welding current and which also dissipates gases caused during the welding operation.

Further objects and advantages of this invention will be apparent from the following detailed description of a presently-preferred embodiment thereof, which is illustrated in the accompanying drawing.

Figure 1:
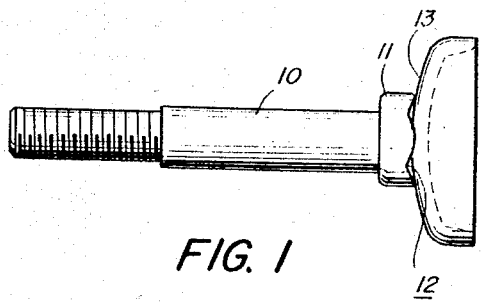
FIGURE 1 is an elevation of the present weld bolt having its head abutting against a convex surface to which it is to be resistance-welded.

Referring to FIGURE 1, the weld bolt of the present invention comprises a shank 10 having an integral, larger diameter head 11 at one end presenting an end face 12 (sometimes referred to as a generally concave face) for engagement with a convex surface 13 on another part to which the weld bolt is to be resistance-welded. The weld bolt is made of any suitable material adapted for resistance welding.

In accordance with the present invention, the end face 12 of the bolt has a novel configuration which greatly improves the effectiveness of the resistance welding of the bolt to a convex surface.

Figures 2, 3, 4:
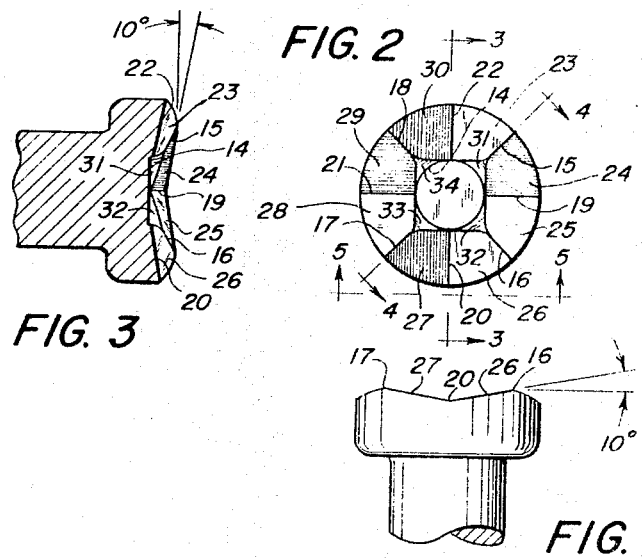
FIGURE 2 is an enlarged plan view of the head end of this bolt.
FIGURE 3 is an axial section through the head end of this bolt, taken along the line 3—3 of FIGURE 2.
FIGURE 4 is an axial section through the head end of this bolt, taken along the line 4—4 in FIGURE 2.
Figure 5:
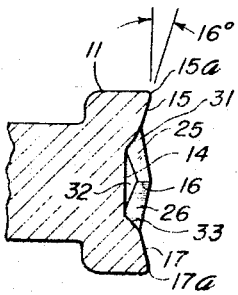
FIGURE 5 is an elevational view of the head end of this bolt, viewed from the line 5—5 in FIGURE 2; and, FIGURE 6 is an enlarged perspective view of the head end of this bolt.
Figure 6:
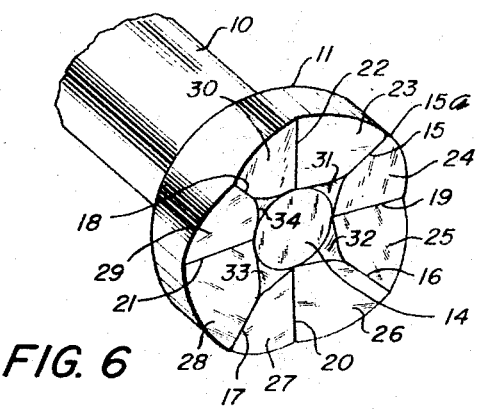

As best seen in FIGURES 2-4, the bolt head has a central axial depression or recess 14 of circular configuration in this end face. Around this central recess, the end face of the bolt head presents alternate peaks 15, 16, 17 and 18 and valleys 19, 20, 21 and 22 evenly spaced in succession circumferentially around the bolt axis, as best seen in FIGURES 2 and 6.

Each peak is connected to the circumferential edge of the head by a rounded corner, 15a and 17a respectively being shown (it being understood that the same holds true for peaks 16 and 18), which in one practical embodiment has a radius of .03 inch or less. Each peak extends a substantial distance radially inward toward the axis of the bolt and inclined toward the opposite end of the bolt. That is, each peak lies in a radial plane but it does not extend perpendicular to the bolt axis. Preferably, as shown in FIGURE 4, each peak 15, 16, 17, 18 extends at an angle of approximately 16 degrees to a reference plane perpendicular to the bolt axis, or stated another way, at an angle of approximately 106 degrees to the bolt axis itself. The rounded peripheral corners (15a, 17a, etc.) of these peaks engage the convex surface 14 (FIGURE 1) of the other part when the bolt is positioned against this surface before and during the resistance welding operation. The described angular disposition of the peaks enables the weld bolt to accommodate, and have a stable engagement against, a variety of different convex surfaces.

The end face 12 of the present weld bolt presents a plurality of pairs of intersecting flat surfaces disposed between successive valleys 19, 20, 21 and 22. A first pair of such surfaces comprises the flat surfaces 23 and 24, which are disposed between valleys 22 and 19 and which intersect one another at the peak 15 between these valleys. These flat surfaces 23 and 24 diverge away from the peak 15 at opposite acute angles to a reference plane perpendicular to the bolt axis. Preferably, as shown in FIGURE 3, surface 24 extends at an angle of approximately 10 degrees to this reference plane. The adjoining surface 23 extends at an opposite 10 degree angle to this reference plane.

Similarly, a second pair of such intersecting flat surfaces 25 and 26 (FIGURE 2) are disposed between valleys 19 and 20, and intersect one another at the peak 16, these flat surfaces being disposed at opposite 10 degree angles to a reference plane perpendicular to the bolt axis.

A similarly disposed pair of flat surfaces 27 and 28 between valleys 20 and 21 intersect one another at the peak 17, and another pair of such flat surfaces 29 and 30 between valleys 21 and 22 interest each other at the remaining peak 18.

Four additional, slightly convex surfaces 31, 32, 33 and 34 are disposed between the flat bottom of the central depression 14 in the head and the aforementioned pairs of intersecting surfaces 23 and 24, 25 and 26, 27 and 28, and 29 and 30, respectively. Each of the surfaces 31–34 extends generally at an angle appreciably greater than 16 degrees with respect to the bottom of recess 14 (which is disposed perpendicular to the bolt axis). Surface 31 is symmetrical with respect to the peak 15 which it intersects. The same is true of surfaces 32, 33 and 34 with respect to peaks 16, 17 and 18, respectively. As a consequence of the angular disposition of the surfaces 31–34 and their symmetry with respect to the peaks 15–18, each of the peaks ends approximately mid-way between the circumferential edge of the head and the adjacent edge of the central recess 14, whereas the valleys 19–23 extend from the circumferential edge to the edge of recess 14.

In the use of this weld bolt, its four evenly spaced peaks 15–19 have a physically stable engagement with correspondingly spaced points on the concave surface 13, as indicated in FIGURE 1. The heights of these peaks can be kept substantially level with one another, with a maximum deviation of less than .005 inch due to manufacturing tolerances, so that the bolt will extend substantially directly perpendicular to the central axis of the part which presents the convex surface 13. The valleys 19–22 and the surfaces between the peaks provide vent passage for any gas which may be generated when the bolt is resistance-welded to surface 13. The practical consequence of these novel characteristics of the present weld bolt is that it can be effectively resistance-welded to such convex surfaces with a much smaller incidence of failures than was possible in practice heretofore.

While a specific presently-preferred embodiment has been described in detail herein and illustrated in the accompanying drawing, it is to be understood that various modifications, omissions and refinements which depart from the disclosed embodiment may be adopted without departing from the spirit and scope of this invention.

What is claimed is:

1. A weld bolt adapted to be resistance-welded to a support surface including a convex support surface, said weld bolt comprised of material adapted for resistance welding and at one end having an enlarged head with an end face having a central axial depression therein and at its circumference presenting alternate peaks and valleys in succession around said central depression, each said peak extending a substantial distance radially inwardly from the circumference of the head toward said central depression and inclined toward the opposite end of the bolt, said end face of the bolt having a plurality of pairs of intersecting substantially flat surfaces disposed between successive valleys in succession around said central depression, with the respective surfaces of each pair intersecting one another at a respective peak and diverging away from each other at opposite acute angles to a reference plane perpendicular to the axis of the bolt, each said valley being defined by given ones of said surface between adjacent peaks and extending radially inwardly from the circumference of the head toward said central depression and terminating substantially thereat, each said peak adapted to engage the support surface substantially only at the circumference of the head prior to the welding operation with the remainder of each said peak being slightly spaced from the support surface whereby each said peak is initially melted at the circumference of the head and as welding proceeds each said peak is progressively melted toward said central depression.

2. The weld bolt of claim 1, wherein each said peak extends at an angle of substantially 106 degrees to the axis of the bolt in a plane disposed radially of said axis, and each of said flat surfaces extends at an angle of substantially less than 16 degrees to said reference plane.

3. The weld bolt of claim 2, wherein each of said flat surfaces extends at an angle of substantially 10 degrees to said reference plane.

References Cited by the Examiner

UNITED STATES PATENTS

| 2,167,285 | 7/1939 | Smith | 151—41.7 |
| 2,595,830 | 5/1952 | Demboske | 151—41.7 |
| 2,936,806 | 5/1960 | Harper | 151—41.7 |

FOREIGN PATENTS

| 702,254 | 1/1954 | Great Britain. |
| 732,714 | 6/1955 | Great Britain. |

CARL W. TOMLIN, *Primary Examiner.*

M. PARSONS, *Assistant Examiner.*